United States Patent
Haster

(10) Patent No.: US 6,335,929 B1
(45) Date of Patent: Jan. 1, 2002

(54) CONTROL OF COMMUNICATION TRAFFIC

(75) Inventor: Lars-Olof Haster, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/461,828

(22) Filed: Dec. 15, 1999

Related U.S. Application Data

(63) Continuation of application No. PCT/SE98/01148, filed on Jun. 15, 1998.

(30) Foreign Application Priority Data

Jun. 16, 1997 (SE) .................................................... 9702292

(51) Int. Cl.⁷ .................................................... H04L 12/66
(52) U.S. Cl. .................................................... 370/352; 370/522
(58) Field of Search .................................... 370/352, 355, 370/401, 463, 493, 522, 437, 438; 379/219, 220, 221, 419, 420, 463; 709/239, 249, 225, 227, 229

(56) References Cited

U.S. PATENT DOCUMENTS

| | | | | |
|---|---|---|---|---|
| 5,610,910 A | * | 3/1997 | Focsaneanu et al. ........ 370/351 |
| 5,699,528 A | * | 12/1997 | Hogan ............................. 705/40 |
| 5,732,078 A | * | 3/1998 | Arango .......................... 370/355 |
| 5,751,574 A | * | 5/1998 | Loebig ........................... 364/187 |
| 5,781,623 A | * | 7/1998 | Khakzar ........................ 379/230 |
| 5,959,988 A | * | 9/1999 | Bjorkman et al. ........... 370/389 |
| 5,987,606 A | * | 11/1999 | Cirasole et al. .............. 713/200 |
| 6,011,844 A | * | 1/2000 | Uppaluru et al. ............ 379/220 |

FOREIGN PATENT DOCUMENTS

| EP | 731618 | 9/1996 |
|---|---|---|
| JP | 8265884 | 10/1996 |

* cited by examiner

Primary Examiner—Hassan Kizou
Assistant Examiner—Saba Tsegaye
(74) Attorney, Agent, or Firm—Burns, Doane, Swecker & Mathis, L.L.P.

(57) ABSTRACT

Communication traffic for sets connected to the same access network is controlled where every call request is linked to a local exchange. A protocol in the access network and the local exchange makes it possible to connect sets connected to the access network to communicate with each other. An identifying device in the local exchange identifies call request signals having the destiny to the same access network from which a call request comes from in order to send back an allocation signal to set up the call inside the access network according to the protocol without having a pathway for the call in question between the access network and the local exchange during the call connection. Calls to sets not connected to the same access network are set up and served in the same way.

16 Claims, 3 Drawing Sheets

CONTROL OF COMMUNICATION TRAFFIC

This application is a continuation of PCT/SE98/01148 filed Jun. 15, 1998.

This invention relates to method and device for controlling communication traffic, and particular to managing of communication traffic to networks, which will be occupied for a long time during the communication, such as communication between a telephone set and an internet or the like. It relates also managing of communication between telephone sets connected to the same access network (AN).

BACKGROUND

The European Telecommunications Standard Institute (ETSI) has produced standards of type V, the V5.1 and V5.2 interfaces (ETS 300 324-1 and ETS 300 347-1), as an interface between two systems, an Access Network (AN) and a Local Exchange (LE), with flexible (provisioned) information channel (bearer channel) allocation. Supported access types in the V5 interface standard are ISDN-BA and PSTN services. ISDN-BA are provided for digital communication and PSTN for speech communication.

An access network is a system which is implemented between the Local Exchange and the user. Several access networks can be connected to the same local Exchange.

An interface within ETSI has been defined to connect Access Networks (AN) to Local Exchanges (LE). Two V5 interfaces have been defined, one for multiplexing and the second for concentration capabilities in the AN controlled by the LE. This invention relates essentially to the V5.2 interface which concentrates the traffic and causes congestion for others when a sufficient number of users change the traffic behaviour from ordinary telephone calls to calls to be digitised and connected to an internet, a management network, an intranet or the like. This is also due for management networks.

The V5 interface standard, as defined in ETSI having the reference ETS 300 347-1 and ITU-T having the reference G.965, has no support for dropping traffic of the kind mentioned above already in the access network.

PCs (PC=Personal Computers) are nowadays often and will in the future automatically be provided with a multimedia interface, such an access to a data network, e.g. a public data network, for instance an internet, i.e. comprising multiple subnetworks communicating with each other. The PC is connected to the telephone net by means of a modem. Telephone communication between the PC and the public data network often takes a long time, which occupies a telephone line during a time essentially exceeding the time of a normal telephone call.

In an earlier system having direct access to a data network, each subscriber could be provided with a unit dividing the calls in telephone traffic and data traffic intended to be sent through different networks. The subscriber had then to have at least two subscriptions, one for the telephone network and one for the data network. A system like that need extra control circuits for the handling of data traffic on to the data network for each subscriber. This is expensive both for the communication company and for the subscriber.

EP-A-0731618 describes a method for controlling communication traffic for sets connected to the same access network, where every call is linked to a local exchange. A protocol is provided in the access network and the local exchange making it possible to connect sets connected to the access network to communicate with each other. The local exchange sends back an allocation signal according to the protocol when the local exchange has identified that a call request has its destiny to the access network which the call request come from, to set up the call inside the access network without having a pathsway set up for the call in question between the access network and the exchange during the communication.

SUMMARY

It is important to provide a cheap and functional telecommunication network which always is available to transmit a call from a subscriber. Concentration of traffic is a common method used in transmission networks to reuse transmission lines for several subscribers. This method is well known and is build on Erlang's model and very useful for ordinary analogue PSTN services (PSTN=Public, Switched Telephone Network). Nowadays, when the network has become overloaded with data service which has a different behaviour than ordinary telephone calls the existing traffic model need be justified. Data service behaviour can have quite short call length but generate more signalling than ordinary calls. Other data services like internet calls or the like have very long call lengths and no or very low signalling. This invention intends to provide a solution of the last-mentioned situation.

The invention provides a simple and inexpensive solution for minimizing the burden imposed on normal telephone traffic by the calls to data services. Data traffic across a telephone line connected to a local exchange in a telephone network will occupy this line for a considerable time period. The data traffic is, for instance, communication between a subscriber and the Internet or an intranet or the like. The invention separates this data traffic out from ordinary telephone traffic to thereby minimize the influence on ordinary telephone traffic.

An object of the invention is to provide a solution on the problem mentioned above.

To make it possible for ordinary telephone calls to be served in the same way as earlier the long time data traffic need be separated out from the V5.2 interface. Thus, the internet traffic should be routed from the calling station to a dedicated device, such as an access server, placed in or in the connection to the same access network as the calling station and connected almost directly to the long time network, such as internet or the like. The access server multiplexes the calls from the users of the access network before transmitting them to the long time network on only one line. Additional functionality could be made in the ordinary BCC protocol (BCC=Bearer Channel Connection) to allow internal call set-up in the access network controlled in the same way from the local exchange as ordinary calls. The intention according to the invention is that the access server should send a series of data packets for all the subscribers connected to the access network directly to the long time data network.

Thus, functionality already existing in the V5.2 interface standard is added to set-up internal connections in the access network to dedicated networks for internet kind of traffic or the like. The same access server could be used for a number of dedicated networks connected to a switch of for instance the ATM-kind connected to the dedicated networks, or an individual access server could be provided for each dedicated network or a mixture of these possibilities could be provided. The access server could be connected and treated by the access network in the same way as anyone of the telephone lines connected to it, i.e. it has the same type of protocol with L3-address etc.

When a subscriber makes a dial in order to connect to an internet or the like a connection is first made from the access network to a local exchange with a V5.2 interface. The BCC-protocol provided with an amendment makes it possible for the access network to provide internal connections between subscribers connected to the same access network. The local exchange identifies the call as a call to the data network and sends back an allocation to the calling set. The access network reacts on this allocation and makes a direct connection between the calling set and the access server. Thereafter the connection between the user and the data network is established without going through the local exchange and the V5.2 interface on bearer channels (B-channels) even though the local exchange still monitors the call through the C-channel for signalling. Thus, the public telephone network will not be loaded by the long time data traffic.

The invention add functionality already existing in the V5.2 interface standard to set-up internal connection in the access network to dedicated networks for data communication with for instance an internet. The invention will not interfere with the ordinary telephone traffic to subscribers outside the actual access network and/or data traffic of other kind than the one in the data network to which the access server(s) are directly connected to. The invention can act together with the AXE-system.

BRIEF DESCRIPTION OF THE DRAWINGS

The invention will in the following be further described in a non-limiting way under reference to the accompanying drawings in which.

DETAILED DESCRIPTION

Figure 1:
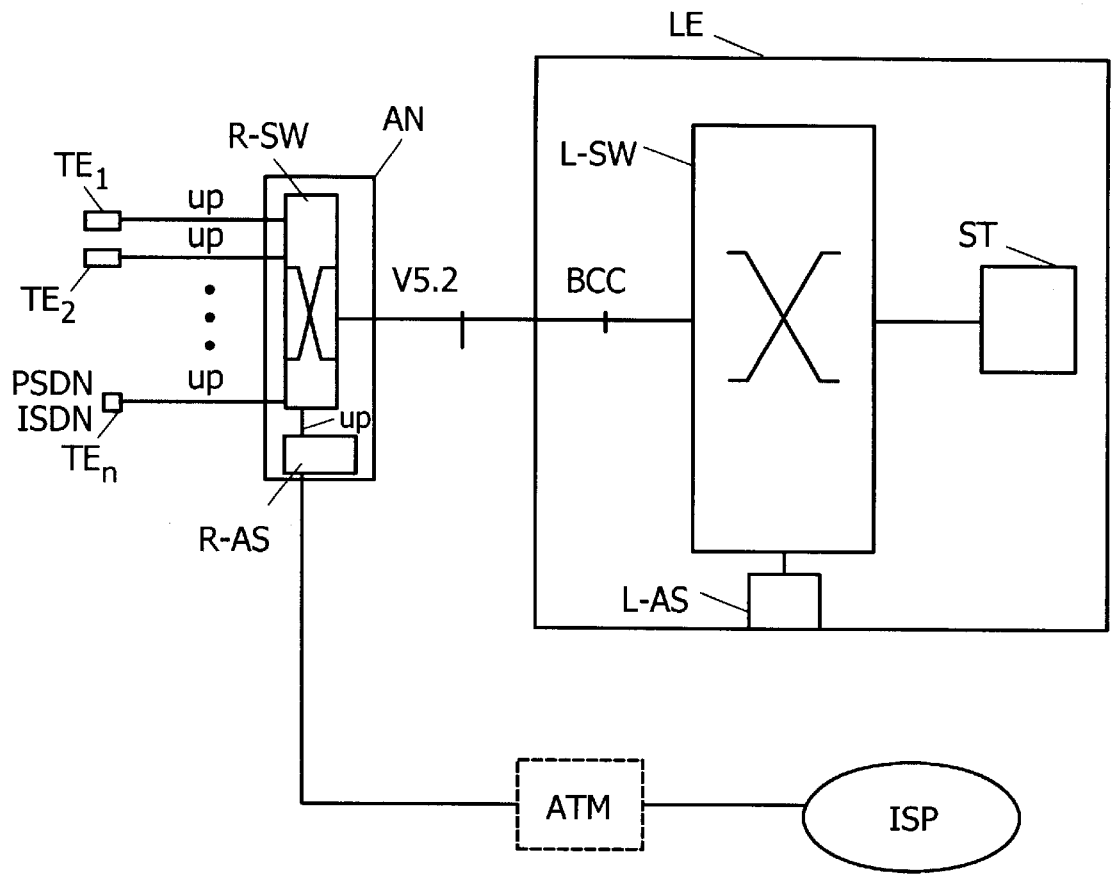
FIG. 1 schematically indicates a first embodiment of the invention.

A number of subscribers TE1, TE2, ... TEn are connected to a switch device R-SW in an access network AN each through an interface up having a protocol comprising at least an L3 and an EF address. The access network AN is connected to a local exchange LE through a V5.2 interface which concentrates the traffic and supports narrow band access connections for PSTN, ISDN-BA and ISND-PRA or the like.

The interface V5.2 uses a slightly amended BCC protocol defined in V5.2 (ETS 300 347-1, clause 17) where the amendment is such that it is possible to establish a direct connection between sets connected to the same access network AN.

A call request from a subscriber set TEi, where i is any number between 1 and n, is linked from the AN through the interface V5.2 and through a local exchange switch L-SW in the local exchange LE to a signal terminal ST connected to the switch. As according to ordinary systems today, at least one access server L-AS is connected to the switch L-SW. An access server is an equipment located between the users concentrating and multiplexing the digital calls from them and a service provider for a long time data network, such as an internet, a management network, an intranet or the like. The service provider provides dialled-up packet data communication in the telephony network. The access server functionality is to adapt the user communication to the long time data network with a modem function if the telephone network is PSTN or no modem is the telephone network is ISDN, multiplex several users to higher orders transmission and authorisation of each user to the service provider. The access server function is also to concentrate data traffic from the subscribers connected to the access network to a common outgoing leased line.

Each long time data network, such as an internet, a management network an intranet or the like could have a separate access network L-AS or a number of long time data networks could share the same access server on a multiplex basis. It is to be noted that the access server L-AS also has a multiplex function for all the subscribers which desire to have connection to the long time network at the same time. Since the use of the internet called Internet has grown very fast one access server to Internet is often not enough and therefore there are often several access servers connected to serve the Internet parallelly in order to avoid traffic jam when many subscribers desires connection to the Internet simultaneously. It is also to be noted that the L-AS must not be situated in the local exchange LE but for instance in another local exchange to which LE is connected or in a transit station or the like, as known by the man skilled in the art.

Earlier each access server in the local exchange LE forwarded the IP package traffic from the local exchange LE via a link to the Internet Service Provider (ISP). However, when the internet use has extended and the Access network to local exchange links are dimensioned to old traffic figures this has an adverse effect influence on the normal traffic and this must be avoided. Almost every bearer line between an access network and a local exchange could sometimes be loaded with a long time data network traffic.

According to the invention, connections to the long time data networks are provided via the access network AN having at least one access server R-AS to which connection from a calling set $TE_i$ connected to the switch R-SW could be established inside the access network AN. The purpose of placing an access server or access servers R-AS in the access network AN is to provide an effective way for transmission from the access network AN to the service provider ISP. The connection to the service provider ISP could be made from several access networks and then the connection must be provided through a switch of some kind, for instance an ATM switch handling data packet (data cell) transfer.

An access server R-AS in the access network does not only limit user services to be routed to dedicated networks. Also the management system signalling could find the functionality useful to multiplex different TCP/IP based signalling or the like.

Figure 2:
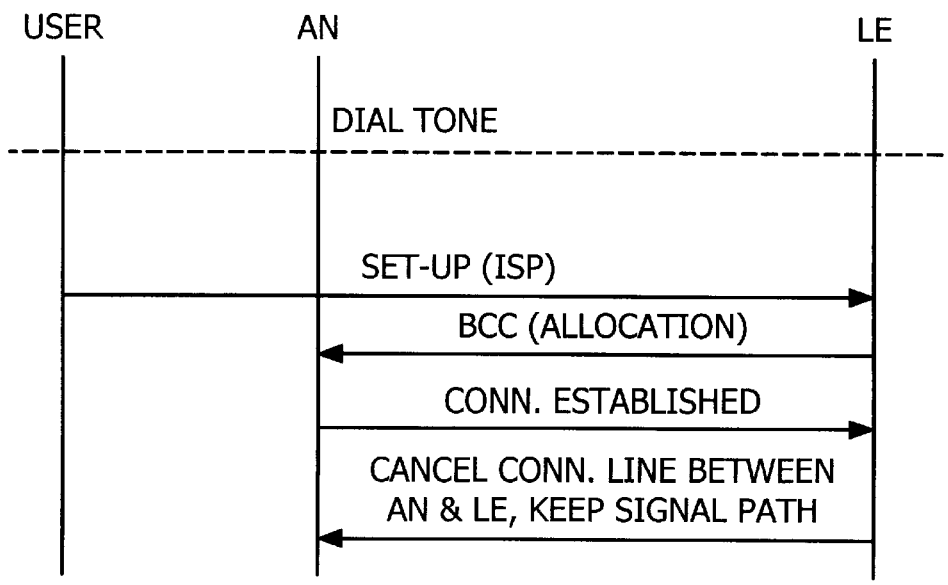
FIG. 2 is an arrow diagram indicating the functional procedure at set-up of a communication.

When a user desires to establish a set-up to for instance an Internet the procedure from the off-hook to the Dial Tone is the same as for ordinary calls, i.e. the signalling is provided from the user through the switch R-SW in the access network through the V5.2 interface to the local exchange LE, and there through the switch L-SW to the signal terminal ST. Then, as apparent from FIG. 2, when the user has dialled a number for connection to a service provider ISP for for instance an internet, and the signal terminal has identified the call request a signalling BCC (ALLOCATION) is sent back to the access network AN setting up a connection between the user TE_i and the access server R-AS. An ESTABLISHED signal is sent back to the signal terminal ST indicating that the internal line is established and that the B-channels for the call established during the call request between the access network and the local exchanged can now be cancelled. However, the signalling C-channel should be opened during the durability of the call. Then, when the user ends the call, and the handset goes on-hooked, the signalling between the access network and the signal terminal ST in the local exchanged is provided as for an ordinary call with the exception that a signalling is provided to the switch R-SW in the access network AN according to the amended BCC protocol to release the established internal connection between the user and the access service.

Figure 3:
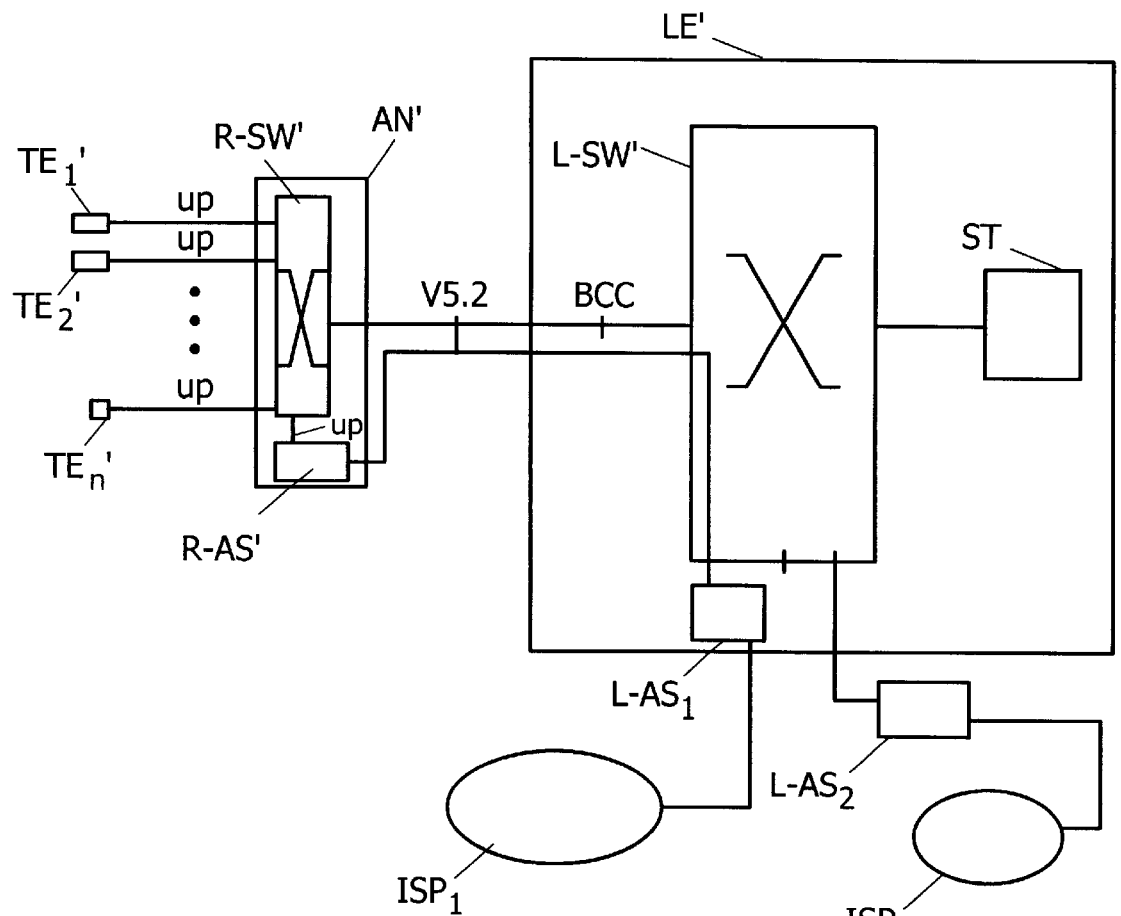
FIG. 3 illustrates a second embodiment of the invention.

In the embodiment shown in FIG. 3, a connection line is not drawn from the access network AN' directly to a service provider. The access server R-AS' in the access network AN' to which all the connections to the long time data network, such as internet, are connected has its output having the multiplexed data packages destined to the service provider $ISP_1$ connected through only one B-channel line, which could be leased for this kind of traffic in the V5.2 interface between the access network AN' and the local exchange LE' to an access server $L-AS_1$, connected to the switch L-SW' in the local exchange. Thus, only one B-channel line is occupied by the long time data traffic. This embodiment is due when no direct connection line to an intranet or the like is not yet available.

As mentioned above the invention is not only related to connections to a long time data network and/or a network requiring a broad bandwidth for transfer of information, for instance for multimedia information like images, music, video or the like. It also relates direct connections between users connected to the same access network.

Figure 4A:
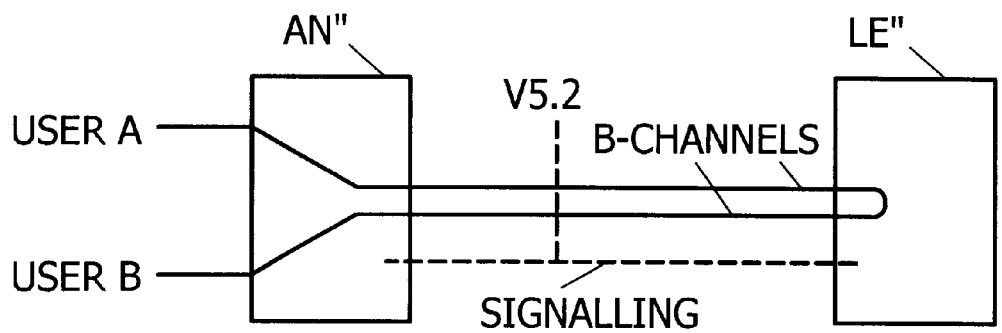
FIG. 4A illustrates a connection of a call between two users connected to the same access network according to the prior art.
Figure 4B:
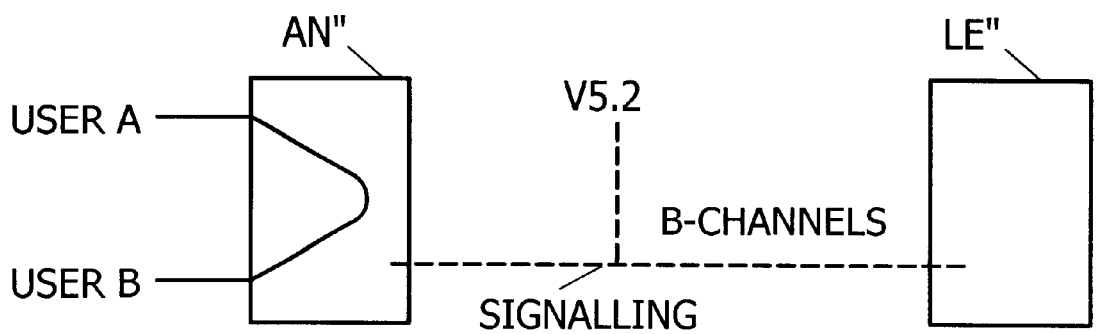
FIG. 4B illustrates a connection of a call between two users connected to the same access network according to the invention.

FIG. 4A illustrate the connection established in the prior art between a user A desiring a call to a user B connected to the same access network AN". The connection is provided across two bearer channels (B-channels) in the V5.2 interface between the access network AN" and the local exchange LE" supervised by the signalling channel (C-channel). FIG. 4B illustrates the connection established according to the invention. Modifications are done in the BCC protocol to allow direct connections between the user port A and the access server as the user B in the same access network AN" where the ports A and B are provisioned to the same V5.2 interface. It is to be noticed that the connection is still supervised by the local exchange through the C-channel, and the signalling from each call using intra-switching in the access network AN" is still connected and running on the V5 interface.

The protocol changes are done in such a way that it is backward compatible. The amendment in the BCC-protocol is also such that if the access network AN" does not have the capability implemented to support intra-switching, which normally should be provisioned in the local exchange LE" for each V5 interface, the access network AN" shall indicate that fact by sending ALLOCATION REJECT and the call and connection will then be set-up as shown in FIG. 4A.

Calls to sets not connected to the same access network are set up and served in the same way as earlier, i.e. across B-channels between their respective access networks and local exchange and are not influenced by the features according to the invention.

What is claimed is:

1. Method for controlling communication traffic for sets connected to the same access network, where every call request is linked to a local exchange, the method comprising:

providing a protocol in the access network and the local exchange, making it possible to connect sets connected to the access network to communicate with each other and with at least one long time data network;

sending an allocation signal from the local exchange to the access network according to said protocol when the local exchange has identified at least one of a call request having a destination to at least one set connected to the access network from which the call request comes from and a call request received from at least one set for the at least one long time data network to set up a call inside the access network without having a pathway set up for the call between the access network and the local exchange during the communication; and providing, in the access network, access server means responsive to the allocation signal for establishing a direct connection between at least one set and the at least one long time data network, wherein calls to the at least one long time data network, having call lengths substantially longer than ordinary telephone call, are separated from calls between the set connected to the access network.

2. Method according to claim 1, wherein said long time network is an internet or a management network.

3. The method according to claim 1, wherein said access server means in the access network multiplexes the calls to the at least one long time network and sends the calls across a common channel from the access network to the at least one long time data network.

4. Method according to claim 1, wherein each call between two sets connected to the same access network is set up inside the access network while canceling a pathway set up between the access network and the local exchange during a call request procedure but keeping a signalling pathway between the access network and the local exchange during the call connection.

5. Equipment for controlling communication traffic comprising:

a plurality of sets connected to;

an access network for communicating call requests from the plurality of sets to;

a local exchange, the local exchange and access network using;

a communication protocol to connect sets connected to the access network to each other and to at least one long time data network, where in when the local exchange has identified at least one of a call request according to the protocol having a destination to at least one set connected to the access network from which the call request came from and a call request received from at least one set for the at least one long time data network, the local exchange sends an allocation signal according to said protocol to the access network to set up a call inside the access network without having a pathway set up for the call in question between the access network and the local exchange during the communication; and access server means located within the access network and responsive to the allocation signal for establishing a direct connection between at least one set and the at least one long time data network, such that calls to the at least one long time data network, having call length substantially longer than ordinary telephone calls, are separated from calls between the sets connected to the access network.

6. Equipment according to claim 5, wherein said long time network is an internet.

7. Equipment according to claim 5, wherein said access server means in the access network collects and multiplexes the calls to the at least one long time network and is connected to send the calls across a common channel from the access network to the at least one long time data network.

8. Equipment according to claim 5, further comprising means to set up calls between two sets connected to the same access network inside the access network while canceling a pathway set up between the access network and the local exchange during a call request procedure but keeping a signalling pathway between the access network and the local exchange during the call connection.

9. A method for controlling communication traffic for sets connected to the same access network, where every call request is linked to a local exchange, the method comprising:

providing a protocol in the access network and the local exchange, making it possible to connect sets connected to the access network to communicate with each other and with at least one long time data network;

sending an allocation signal from the local exchange to the access network according to said protocol when the local exchange has identified a call request having a destination to at least one set connected to the access network from which the call request comes from to set up a call inside the access network without having a pathway set up for the call between the access network and the local exchange during the communication;

sending an allocation signal from the local exchange to the access network according to said protocol when the local exchange has identified a call request received from at least one set for the at least one long time data network to set up a call between the access network and the at least one long time data network using at least one reserved connection through the local exchange during the communication; and providing, in the access network, access server means responsive to the allocation signal for establishing a call between at least one set and the at least one long time data network using the at least one reserved connection through the local exchange, wherein calls to the at least one long time data network, having call lengths substantially longer than ordinary telephone calls, are separated from calls between the sets connected to the access network.

10. The method according to claim 9, wherein said long time network is at least one of an Internet and a management network.

11. The method according to claim 9, wherein said access server means in the access network multiplexes the calls to the at least one long time network and sends the calls across a common bearer channel in a V5.2 interface from the access network to the local exchange and to an access server means connected to the local exchange.

12. The method according to claim 9, further comprising the steps of:

establishing a call between at least two sets connected to the same access network within the access network;

canceling a pathway established between the access network and the local exchange during a call request procedure; and maintaining a signaling pathway established between the access network and the local exchange during the call request procedure throughout the call connection.

13. Apparatus for controlling communication traffic comprising:

a plurality of sets connected to;

an access network for communicating call requests from the plurality of sets to;

a local exchange, the local exchange and access network using;

a communication protocol for connecting sets connected to the access network to each other and to at least one long time data network, such that when the local exchange has identified a call request according to the protocol having a destination to at least one set connected to the access network from which the call request came from, the local exchange sends an allocation signal according to said protocol to the access network to set up a call inside the access network without having a pathway set up for the call in question between the access network and the local exchange during the communication, and when the local exchange has identified a call request received from at least one set for the at least one long time data network to set up a call between the access network and the at least one long time data network, the local exchange sends an allocation signal according to said protocol to the access network to set up a call using at least one reserved connection through the local exchange during the communication; and access server means located within the access network and responsive to the allocation signal for establishing a call between at least one set and the at least one long time data network using the at least one reserved connection through the local exchange, wherein calls to the at least one long time data network, having call lengths substantially longer than ordinary telephone calls, are separated from calls between the sets connected to the access network.

14. The apparatus according to claim 13, wherein said long time network is at least one of an Internet and a management network.

15. The apparatus according to claim 13, wherein said access server means in the access network collects and multiplexes the calls to the at least one long time network and is connected to send the calls across a common bearer channel in a V5.2 interface from the access network to the local exchange and to an access server means connected to the local exchange.

16. The apparatus according to claim 13, further comprising:

means for establishing a call between at least two sets connected to the same access network within the access network;

means for canceling a pathway established between the access network and the local exchange during a call request procedure; and means for maintaining a signaling pathway established between the access network and the local exchange during the call request procedure throughout the call connection.

\* \* \* \* \*